(12) United States Patent
Sawada et al.

(10) Patent No.: US 7,908,057 B2
(45) Date of Patent: Mar. 15, 2011

(54) POWER STEERING APPARATUS

(75) Inventors: Seiji Sawada, Tokyo (JP); Takayuki Kifuku, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1132 days.

(21) Appl. No.: 11/559,668

(22) Filed: Nov. 14, 2006

(65) Prior Publication Data
US 2008/0017439 A1    Jan. 24, 2008

(30) Foreign Application Priority Data
Jun. 23, 2006    (JP) .................................. 2006-173489

(51) Int. Cl.
B62D 5/04    (2006.01)
B62D 6/10    (2006.01)

(52) U.S. Cl. ............. 701/43; 180/421; 180/446; 701/44; 701/31; 318/646

(58) Field of Classification Search .................. 180/421; 701/43, 44, 31; 318/646
See application file for complete search history.

(56) References Cited

U.S. PATENT DOCUMENTS

| | | | |
|---|---|---|---|
| 4,765,426 A * | 8/1988 | Shimizu ........................ | 180/446 |
| 4,802,544 A | 2/1989 | Maeda | |
| 5,105,113 A * | 4/1992 | Ishikura et al. ........... | 310/154.29 |
| 5,521,475 A | 5/1996 | Fu et al. | |
| 5,889,376 A * | 3/1999 | Takatsuka et al. ............. | 318/434 |
| 5,999,869 A * | 12/1999 | Nishimoto et al. .............. | 701/41 |
| 6,041,884 A * | 3/2000 | Shimizu et al. ............... | 180/443 |
| 6,054,827 A * | 4/2000 | Takatsuka et al. ............. | 318/474 |
| 6,351,050 B1 * | 2/2002 | Coles ........................ | 310/156.53 |
| 6,906,483 B2 | 6/2005 | Tominaga et al. | |
| 7,187,153 B2 * | 3/2007 | Imagawa et al. ............... | 318/638 |
| 7,423,397 B2 * | 9/2008 | Katahira ........................ | 318/432 |
| 7,559,405 B2 * | 7/2009 | Kumaido et al. ............. | 180/446 |
| 7,624,838 B2 * | 12/2009 | Kifuku et al. .................. | 180/446 |
| 2001/0051845 A1 * | 12/2001 | Itoh ................................. | 701/43 |
| 2004/0257018 A1 * | 12/2004 | Tobias et al. ................... | 318/439 |
| 2006/0001392 A1 * | 1/2006 | Ajima et al. .................... | 318/432 |
| 2006/0060412 A1 * | 3/2006 | Bolourchi et al. ............. | 180/443 |
| 2008/0004773 A1 * | 1/2008 | Maeda ............................ | 701/41 |
| 2008/0218023 A1 * | 9/2008 | Niguchi et al. ............ | 310/156.55 |

FOREIGN PATENT DOCUMENTS

| | | |
|---|---|---|
| DE | 198 11 992 A1 | 9/1999 |
| DE | 102 39 297 B4 | 5/2006 |
| JP | 06-211142 A | 8/1994 |
| JP | 06211142 A * | 8/1994 |
| JP | 07-096387 | 4/1995 |
| JP | 09-301200 A | 11/1997 |
| JP | 09301200 A * | 11/1997 |
| JP | 11-139327 | 5/1999 |
| JP | 2001-171539 | 6/2001 |
| JP | 2002-249062 A | 9/2002 |
| JP | 2002249062 A * | 9/2002 |
| JP | 2005-271827 A | 10/2005 |

* cited by examiner

*Primary Examiner* — Thomas G Black
*Assistant Examiner* — Lin B Olsen
(74) *Attorney, Agent, or Firm* — Sughrue Mion, PLLC

(57) ABSTRACT

Provided is a power steering apparatus capable of suppressing an abrupt change in steering force and preventing a deterioration in steering feeling even in the event of a transition from power steering to manual steering. The power steering apparatus includes a torque sensor, a motor of a permanent magnet field type, and a controller having a motor driving unit and an abnormality monitoring unit, for controlling the driving of the motor. The motor driving unit includes an inverter for driving the motor, and a drive signal generating unit for calculating a target current caused to flow through the motor and outputting a drive signal of the inverter based on the target current. The abnormality monitoring unit includes an abnormality processing unit for constituting a closed-loop circuit including the motor in stopping the driving of the motor.

6 Claims, 10 Drawing Sheets

POWER STEERING APPARATUS

BACKGROUND OF THE INVENTION

1. Field of the Invention

The present invention relates to a power steering apparatus mounted on a vehicle, for instance.

2. Description of the Related Art

A general power steering apparatus is equipped with a torque sensor for detecting a steering force exerted by a driver, a motor for supplementing the steering force, an inverter for driving the motor, and a target current calculating unit for calculating a target current caused to flow through the motor in accordance with an output of the torque sensor.

The inverter, which is composed of switching elements, controls the driving of the motor through PWM-modulated voltage pulses with a constant frequency.

A conventional electric power steering apparatus is equipped with a motor driving unit (an inverter). In the motor driving unit, while a power source is connected between input terminals of a bridge circuit composed of four pairs of field effect transistors, an electric motor (i.e., a motor) is connected between output terminals of the bridge circuit. The power steering apparatus causes a current to flow through the motor by the motor driving unit to apply a motor power to a steering system. A switch unit is interposed between the motor driving unit and the motor or between the power source and the motor driving unit (e.g., see JP 07-96387 B).

In the aforementioned conventional apparatus, the switch unit is opened to shut off the inverter and the motor from each other or the power source and the inverter from each other when an ON-malfunction occurs in the field effect transistors constituting the bridge circuit.

As described above, the switch unit is opened to shut off the power source and the motor from each other, and a closed-loop circuit is opened to make a transition from power steering to manual steering. Thus, a deterioration in follow-up performance or in steering feeling is prevented.

In the conventional electric power steering apparatus, abrupt disturbances resulting from irregularities of a road surface or the like are directly transmitted to a driver in the event of a transition from power steering to manual steering, so there is caused a problem in that a deterioration in steering feeling cannot be prevented sufficiently.

When the transition from power steering to manual steering is made while the driver exerts a steering force, the motor suddenly stops supplementing the steering force. Therefore, there is also caused a problem in that a deterioration in steering feeling cannot be prevented sufficiently.

SUMMARY OF THE INVENTION

The present invention has been made to solve the problem mentioned above. It is an object of the present invention to provide a power steering apparatus capable of suppressing an abrupt change in steering force and reliably preventing a deterioration in steering feeling even in the event of a transition from power steering to manual steering.

According to the present invention, there is provided a power steering apparatus including: a steering force detecting unit for detecting a steering force; a motor of a permanent magnet field type for supplementing the steering force; and a control unit having a motor driving unit and an abnormality monitoring unit, for controlling driving of the motor, in which: the motor driving unit includes an inverter for driving the motor; and a drive signal generating unit for calculating a target current caused to flow through the motor based on an output of the steering force detecting unit, and outputting a drive signal for driving the inverter based on the target current; and the abnormality monitoring unit includes an abnormality processing unit for constituting a closed-loop circuit including the motor in stopping driving of the motor.

In the power steering apparatus according to the present invention, the abnormality processing unit constitutes the closed-loop circuit including the motor of the permanent magnet field type in stopping the driving of the motor.

Thus, the closed-loop circuit including the motor generates a braking force. Therefore, even in the event of a transition from power steering to manual steering, this braking force can serve to suppress an abrupt change in steering force and prevent a deterioration in steering feeling.

DETAILED DESCRIPTION OF THE PREFERRED EMBODIMENTS

Respective embodiments of the present invention will be described hereinafter based on the drawings. In the respective drawings, similar reference symbols are assigned to similar or corresponding members and portions to be described.

The following embodiments of the present invention will be described as to a case in which a power steering apparatus is mounted on a vehicle.

First Embodiment

Figure 1:
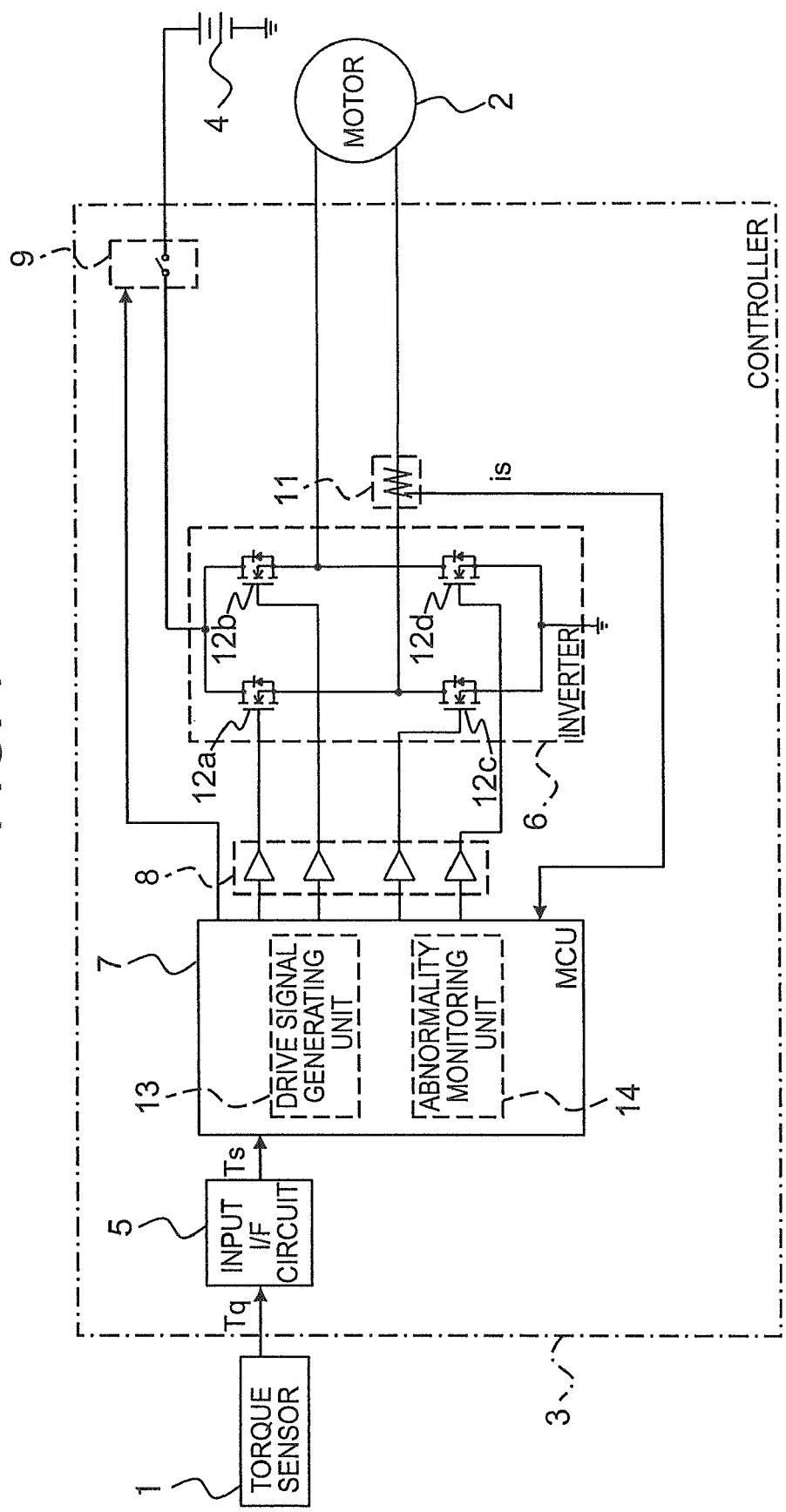
FIG. 1 is a schematic diagram showing a power steering apparatus according to a first embodiment of the present invention.

FIG. 1 is a schematic diagram showing a power steering apparatus according to the first embodiment of the present invention.

Referring to FIG. 1, the power steering apparatus is equipped with a torque sensor 1 (a steering force detecting unit) for detecting a steering force Tq of a driver of a vehicle, a two-phase DC motor 2 (an electric motor) (hereinafter abbreviated as "the motor 2") of a permanent magnet field type for supplementing the steering force Tq of the driver, a controller 3 (a control unit) for controlling the driving of the motor 2, and a battery 4 for supplying the controller 3 with electric power.

The steering force Tq detected by the torque sensor 1 is input to the controller 3. The motor 2 is driven under the control of the controller 3 to apply a torque to a steering system (not shown) of the vehicle.

The controller 3 includes an input interface circuit 5, an inverter 6, a microcomputer 7 (hereinafter abbreviated as "an MCU (abbreviation of micro controller unit) 7"), a gate driving circuit 8, a battery shut off unit 9, and a motor current detecting circuit 11.

The input interface circuit 5, to which the steering force Tq output by the torque sensor 1 is input, outputs a steering force signal Ts to the MCU 7.

The inverter 6 drives the motor 2 through PWM-modulated voltage pulses with a constant frequency. The inverter 6 has FET elements 12a to 12d (switching elements) for generating voltage pulses to be supplied to the motor 2 through switching.

The FET elements 12a and 12b, which are provided between the motor 2 and the battery 4, are referred to as upper FET elements. The FET elements 12c and 12d, which are provided between the motor 2 and the ground, are referred to as lower FET elements.

The MCU 7 includes a drive signal generating unit 13 and an abnormality monitoring unit 14 (which will be described later).

The drive signal generating unit 13 calculates a target current caused to flow through the motor 2, based on the steering force signal Ts. The drive signal generating unit 13 calculates an amount of work in PWM-driving the motor 2 such that the deviation between the aforementioned target current and a current indicated by a motor current signal "is" (which will be described later) becomes 0. The drive signal generating unit 13 generates voltage pulses (drive signals) for driving the FET elements 12a to 12d of the inverter 6 based on the aforementioned amount of work.

The MCU 7 is designed as a microprocessor (not shown) having a storage portion in which programs are stored and a CPU. Respective blocks constituting the MCU 7 are stored as software in the storage portion.

The inverter 6, the motor current detecting circuit 11, and the drive signal generating unit 13 constitute a motor driving unit.

The gate driving circuit 8 amplifies voltage pulses output by the MCU 7, and outputs the amplified voltage pulses to the inverter 6.

The battery shut off unit 9, which is designed as a relay or the like, establishes or breaks a connection between the battery 4 and the inverter 6 in accordance with a connection command or a shut off command from an abnormality processing unit 18 (which will be described later).

The motor current detecting circuit 11 detects a current caused to flow through the motor 2, and outputs the motor current signal "is" to the MCU 7.

Figure 2:
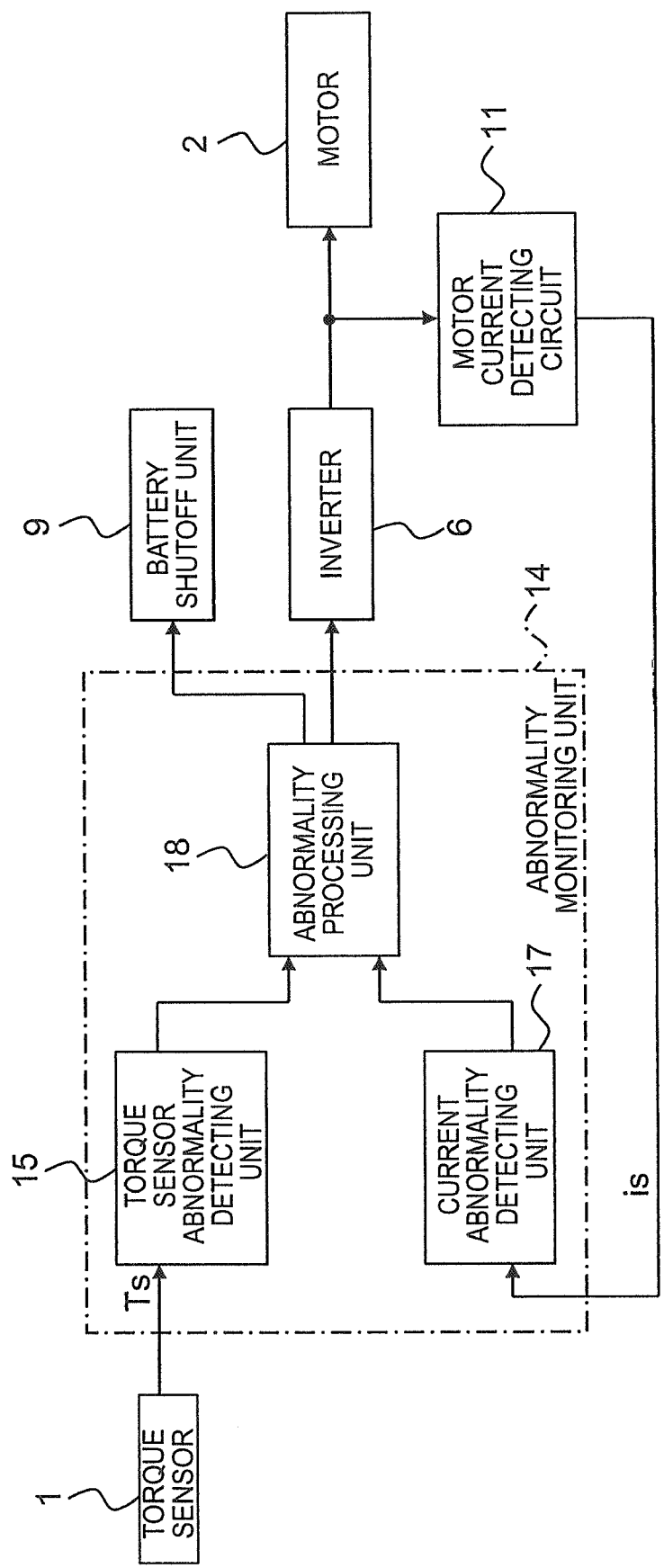
FIG. 2 is a block diagram showing an abnormality monitoring unit according to the first embodiment of the present invention together with peripheral components thereof.

FIG. 2 is a block diagram showing the abnormality monitoring unit 14 according to the first embodiment of the present invention together with peripheral components thereof.

Referring to FIG. 2, the abnormality monitoring unit 14 includes a torque sensor abnormality detecting unit 15 to which the steering force signal Ts from the torque sensor 1 is input, a current abnormality detecting unit 17 to which the motor current signal "is" from the motor current detecting circuit 11 is input, and the abnormality processing unit 18.

The battery 4, the input interface circuit 5, and the gate driving circuit 8, which are shown in FIG. 1, are not illustrated in FIG. 2.

The torque sensor abnormality detecting unit 15 detects an abnormal state of the torque sensor 1 and outputs an abnormality signal to the abnormality processing unit 18 when the steering force signal Ts indicates a value larger than an arbitrarily set upper limit TH or a value smaller than an arbitrarily set lower limit TL.

Figure 3:
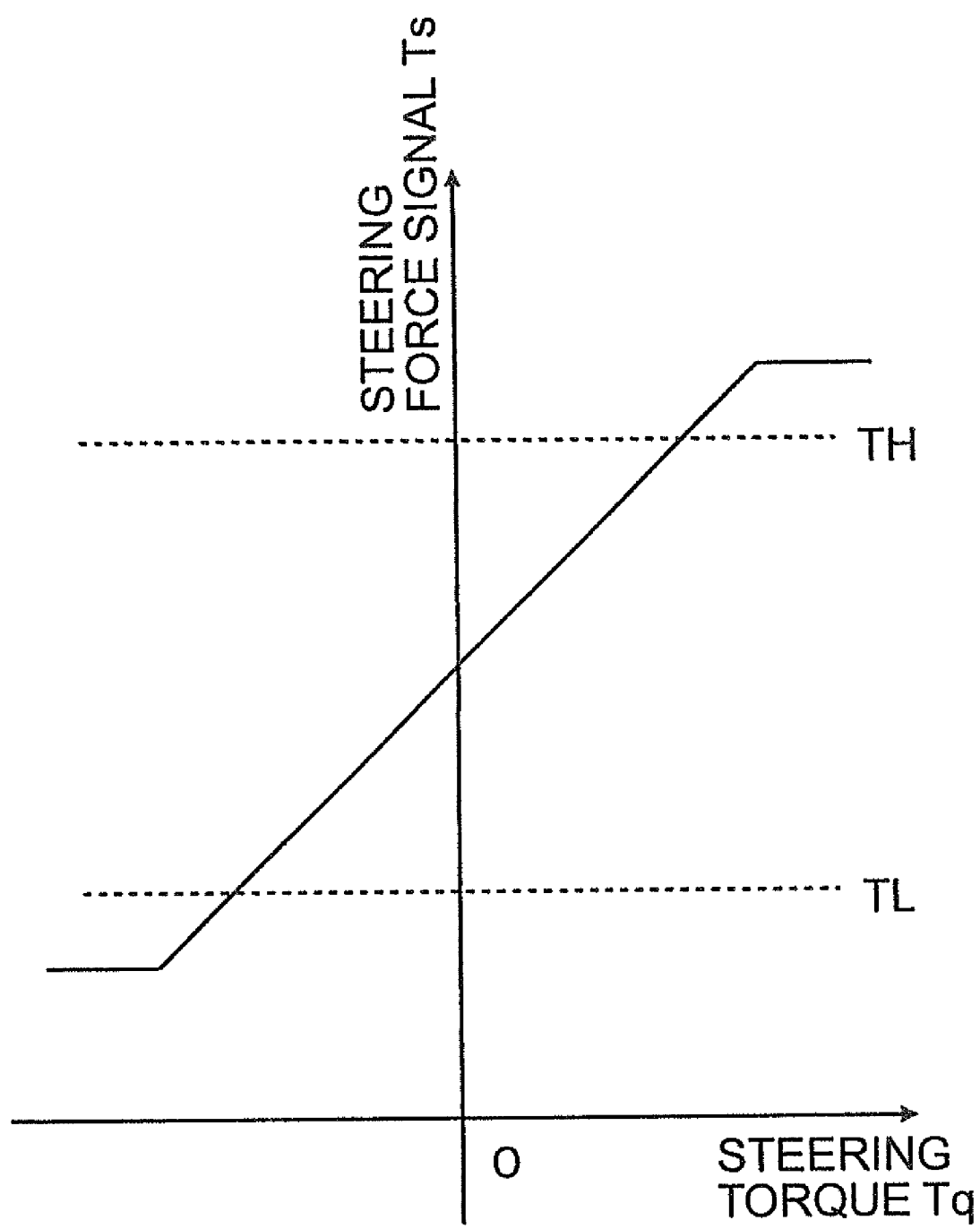
FIG. 3 is an explanatory diagram showing input/output characteristics of an input interface circuit according to the first embodiment of the present invention, and an upper limit and a lower limit of a steering force signal.

FIG. 3 shows input/output characteristics of the input interface circuit 5, and the upper limit TH and the lower limit TL of the steering force signal Ts.

The current abnormality detecting unit 17 detects an abnormal state of at least one of the motor 2 and the motor driving unit and outputs an abnormality signal to the abnormality processing unit 18 when the motor current signal "is" indicates a value larger than an arbitrarily set upper limit iH or a value smaller than an arbitrarily set lower limit iL.

The abnormality processing unit 18 outputs to the inverter 6 an operational command to open the upper FET elements 12a and 12b and an operational command to short-circuit the lower FET elements 12c and 12d to thereby constitute a closed-loop circuit including the motor 2 when an abnormality signal has been output from at least one of the torque sensor abnormality detecting unit 15 and the current abnormality detecting unit 17.

Figure 4:
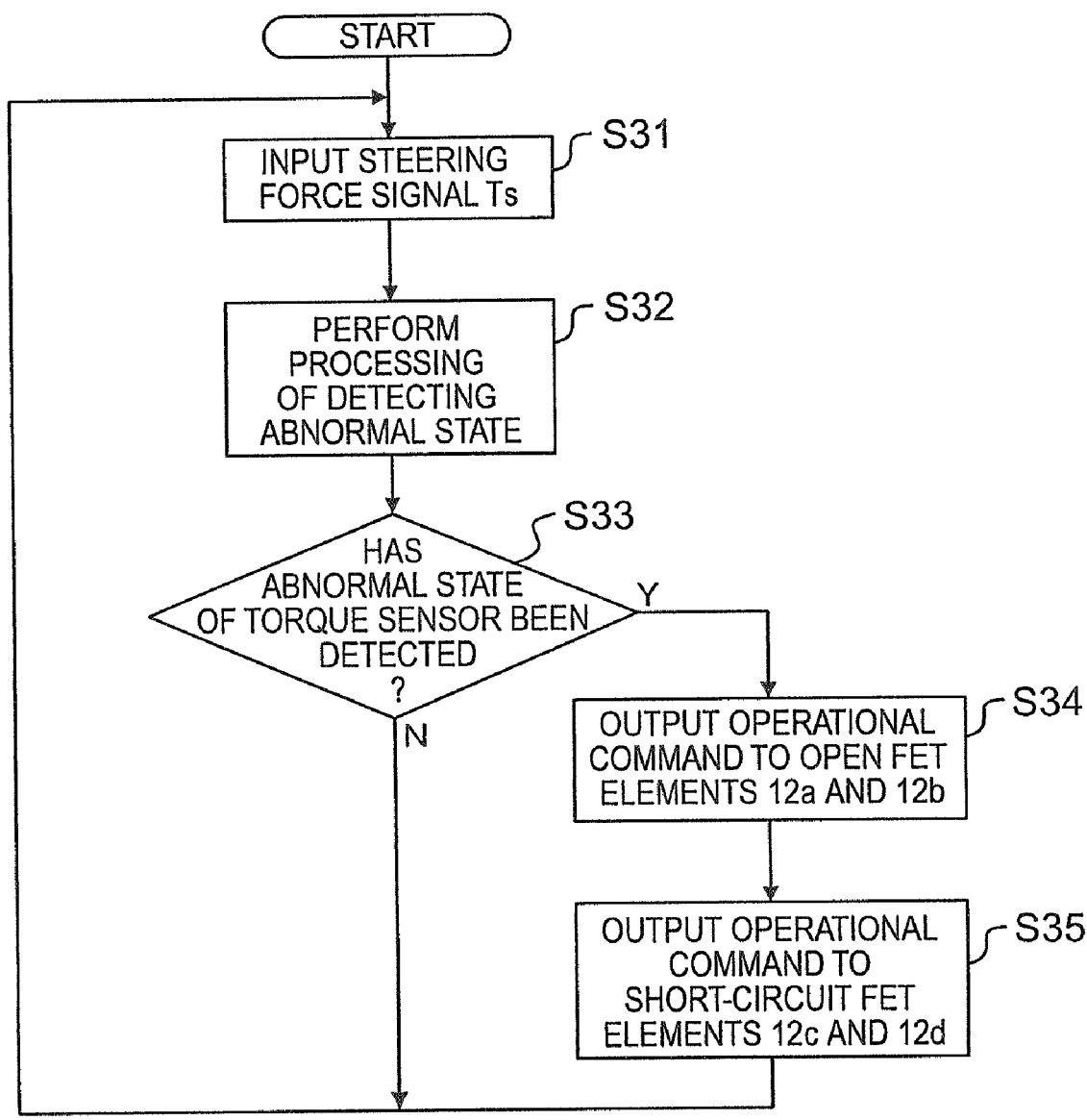
FIG. 4 is a flowchart explaining the operation of a micro controller unit (MCU) according to the first embodiment of the present invention.

The operation of the MCU 7 according to the first embodiment of the present invention will be described hereinafter with reference to a flowchart of FIG. 4 as well as FIGS. 1 to 3. The following description handles an exemplary case in which the torque sensor 1 has become abnormal.

As described above, the first embodiment of the present invention is characterized in that the abnormality processing unit 18 constitutes the closed-loop circuit including the motor 2 in stopping the driving of the motor 2 in accordance with the inputting of an abnormality signal. The drive signal generating unit 13 operates to generate voltage pulses for driving the motor 2 based on the steering force signal Ts and the motor current signal "is", according to a known art.

Therefore, the description of how the drive signal generating unit 13 operates to generate voltage pulses will be omitted.

It is assumed herein that the MCU 7 has not detected any abnormality or the like.

First, the steering force signal Ts, which is output from the input interface circuit 5 in accordance with an output of the torque sensor 1, is input to the torque sensor abnormality detecting unit 15 (Step S31).

Then, the torque sensor abnormality detecting unit 15 determines whether or not the steering force signal Ts indicates a value between the upper limit TH and the lower limit TL, thereby performing a processing of detecting an abnormal state (Step S32). The processing of detecting an abnormal state of the torque sensor 1 is a known art, so detailed description thereof is omitted.

Then, the abnormality processing unit 18 determines whether or not an abnormal state of the torque sensor 1 has been detected (Step S33).

When it is determined in Step S33 that the abnormal state of the torque sensor 1 has been detected (i.e., Yes), an operational command to open the upper FET elements 12a and 12b is output from the abnormality processing unit 18 to the inverter 6 (Step S34).

The upper FET elements 12a and 12b are opened due to this operational command, so the battery 4 and the inverter 6 are shut off from each other.

Then, an operational command to short-circuit the lower FET elements 12c and 12d is output from the abnormality processing unit 18 to the inverter 6 (Step S35).

The lower FET elements 12c and 12d are short-circuited due to this operational command, so input terminals of the motor 2 are short-circuited. As a result, the closed-loop circuit including the motor 2 is constituted.

At this moment, since the motor 2 is designed as a motor of a permanent magnet field type, the closed-loop circuit including the motor 2 operates as a braking circuit without performing field current control when an abnormal state of the torque sensor 1 is detected.

With the power steering apparatus according to the first embodiment of the present invention, when the torque sensor abnormality detecting unit 15 detects an abnormal state of the torque sensor 1 which requires the abnormality processing unit 18 to stop the driving of the motor 2, the abnormality processing unit 18 outputs to the inverter 6 an operational command to open the upper FET elements 12a and 12b and an operational command to short-circuit the lower FET elements 12c and 12d to constitute the closed-loop circuit including the motor 2.

Thus, there is generated a braking force in the closed-loop circuit including the motor 2. Therefore, even in the event of a transition from power steering to manual steering, an abrupt change in steering force is suppressed due to this braking force. Consequently, a deterioration in steering feeling can be prevented.

Second Embodiment

In the aforementioned first embodiment of the present invention, the FET elements 12a to 12d of the inverter 6 are operated to constitute the closed-loop circuit. However, the present invention is not limited to this configuration. It is also appropriate to provide a short-circuiting unit such as a relay between the input terminals of the motor 2 and short-circuit the short-circuiting unit to constitute the closed-loop circuit including the motor 2 when an abnormal state of the torque sensor 1 is detected.

Description of the components identical to those of the first embodiment will be omitted.

Figure 5:
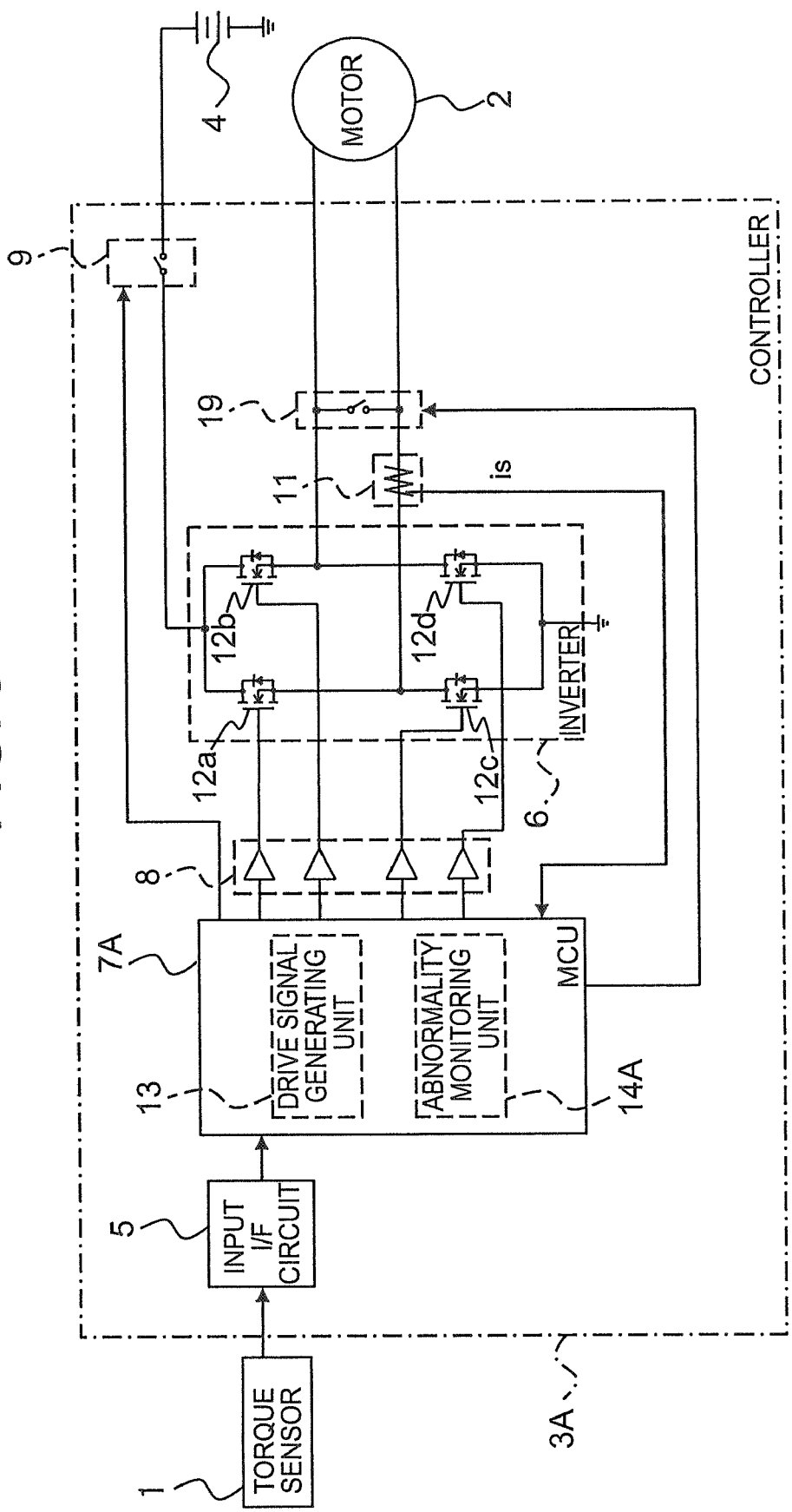
FIG. 5 is a schematic diagram showing a power steering apparatus according to a second embodiment of the present invention.

FIG. 5 is a schematic diagram showing a power steering apparatus according to the second embodiment of the present invention.

Referring to FIG. 5, a controller 3A further includes a motor short-circuiting unit 19 (a short-circuiting unit) provided between the motor 2 and the inverter 6.

The motor short-circuiting unit 19 short-circuits the input terminals of the motor 2 due to a short-circuit command from an abnormality processing unit 18A (which will be described later).

Figure 6:
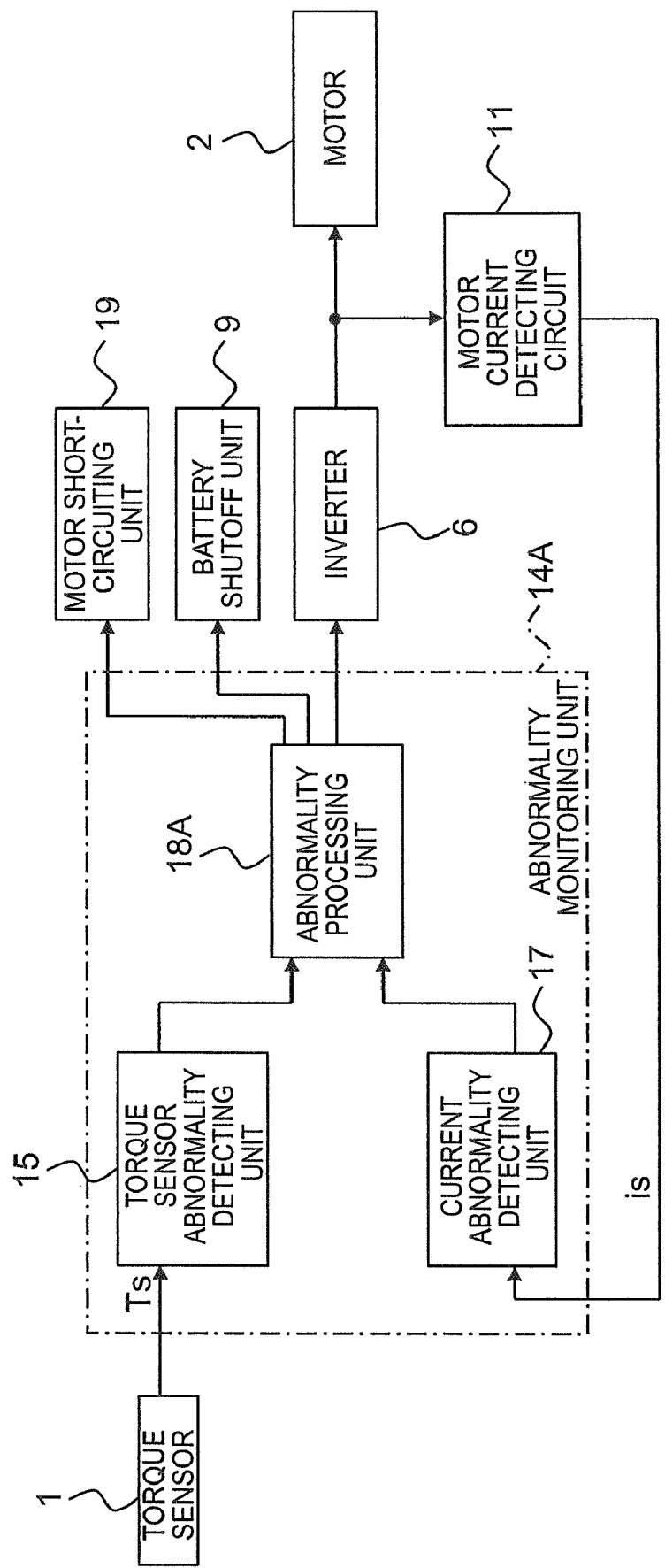
FIG. 6 is a block diagram showing an abnormality monitoring unit according to the second embodiment of the present invention together with peripheral components thereof.

FIG. 6 is a block diagram showing an abnormality monitoring unit 14A according to the second embodiment of the present invention together with peripheral components thereof.

Referring to FIG. 6, the abnormality monitoring unit 14A includes the abnormality processing unit 18A instead of the abnormality processing unit 18 shown in FIG. 2.

The abnormality processing unit 18A outputs a shut off command to the battery shut off unit 9 and a short-circuit command to the motor short-circuiting unit 19 to constitute the closed-loop circuit including the motor 2 when an abnormality signal has been output from at least one of the torque sensor abnormality detecting unit 15 and the current abnormality detecting unit 17.

The second embodiment of the present invention is identical to the aforementioned first embodiment of the present invention in other configurational details, so description thereof will be omitted.

Figure 7:
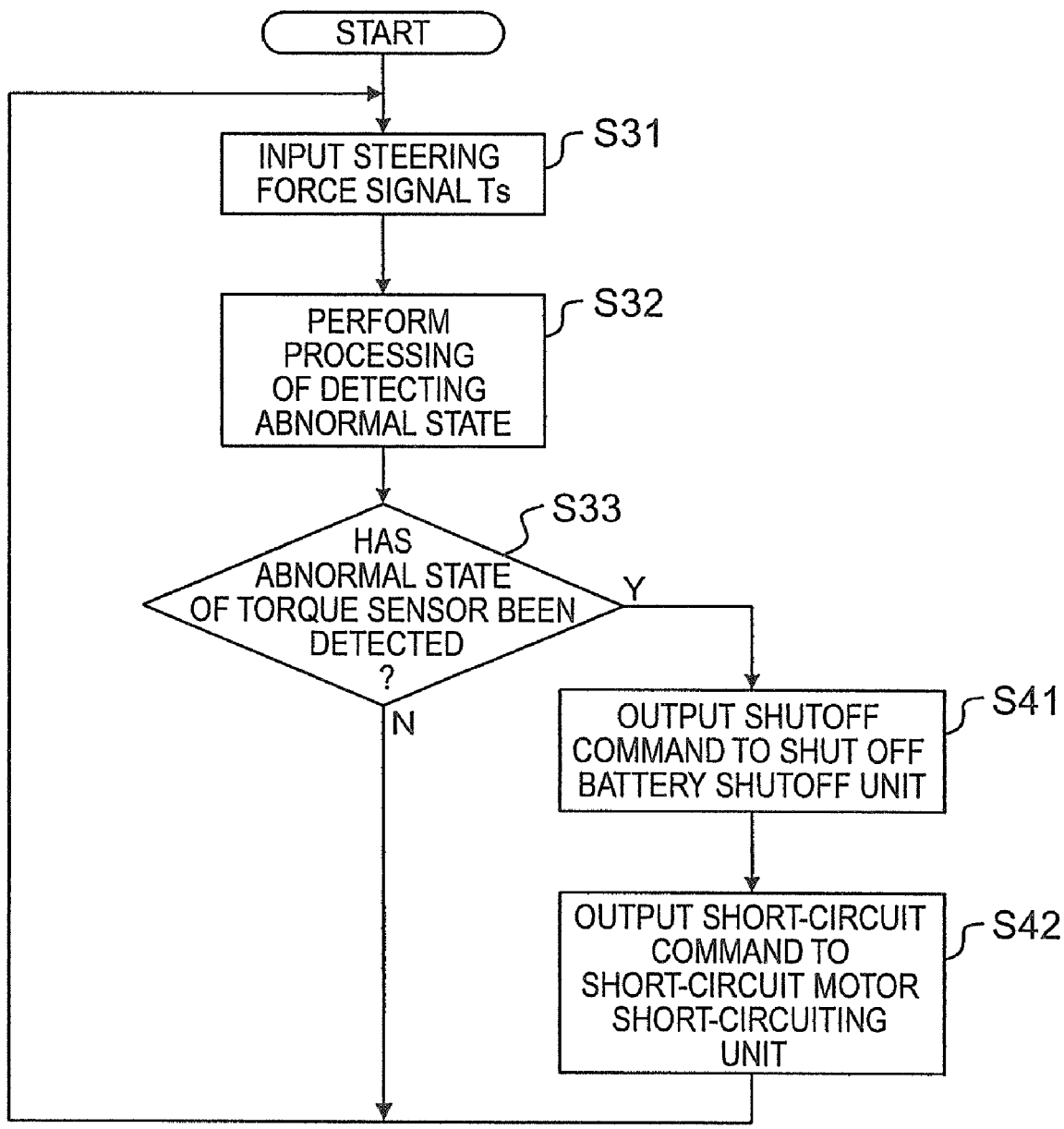
FIG. 7 is a flowchart explaining the operation of a micro controller unit (MCU) according to the second embodiment of the present invention.

The operation of an MCU 7A according to the second embodiment of the present invention will be described hereinafter with reference to a flowchart of FIG. 7 as well as FIGS. 5 and 6.

The same operational details as in the first embodiment of the present invention will not be described.

It is assumed herein that the MCU 7A has not detected any abnormality or the like. At this moment, since the battery shut off unit 9 is connected and the motor short-circuiting unit 19 is open, the motor 2 can be driven.

First, the abnormality processing unit 18A determines whether or not an abnormal state of the torque sensor 1 has been detected (Step S33).

When it is determined in Step S33 that an abnormal state of the torque sensor 1 has been detected (i.e., Yes), a shut off command is output from the abnormality processing unit 18A to the battery shut off unit 9 (Step S41).

The battery shut off unit 9 is opened due to this shut off command, so the battery 4 and the inverter 6 are shut off from each other.

Then, a short-circuit command is output from the abnormality processing unit 18A to the motor short-circuiting unit 19 (Step S42).

The motor short-circuiting unit 19 is short-circuited due to this short-circuit command, so the input terminals of the motor 2 are short-circuited. As a result, the closed-loop circuit including the motor 2 is constituted.

At this moment, since the motor 2 is designed as a motor of a permanent magnet field type, the closed-loop circuit including the motor 2 operates as a braking circuit without performing field current control when an abnormal state of the torque sensor 1 is detected.

With the power steering apparatus according to the second embodiment of the present invention, when the torque sensor abnormality detecting unit 15 detects an abnormal state of the torque sensor 1 which requires the abnormality processing unit 18A to stop the driving of the motor 2, the abnormality processing unit 18A outputs a shut off command to the battery shut off unit 9 and a short-circuit command to the motor short-circuiting unit 19 to constitute the closed-loop circuit including the motor 2.

Therefore, an effect similar to that of the aforementioned first embodiment of the present invention can be achieved.

The operation of the abnormality processing unit 18A according to the aforementioned second embodiment of the present invention has been described as to an exemplary case in which the torque sensor 1 has become abnormal. However, the present invention is not limited to this exemplary case.

For example, even when the FET elements 12a to 12d constituting the inverter 6 have suffered an ON-malfunction, a short-circuit command is output from the abnormality processing unit 18A to the motor short-circuiting unit 19 to short-circuit the input terminals of the motor 2. As a result, the closed-loop circuit including the motor 2 is constituted.

Therefore, as is the case with the aforementioned first embodiment of the present invention, an abrupt change in steering force is suppressed due to a braking force generated in the closed-loop circuit including the motor 2. Consequently, a deterioration in steering feeling can be prevented.

The operations of the abnormality processing unit 18 according to the aforementioned first embodiment of the present invention and the abnormality processing unit 18A according to the aforementioned second embodiment of the present invention have been described as to exemplary cases in which the torque sensor abnormality detecting unit 15 has detected an abnormal state of the torque sensor 1. However, the present invention is not limited to those exemplary cases.

The abnormality processing units 18 and 18A may output a command to the inverter 6, or commands to the battery shut off unit 9 and the motor short-circuiting unit 19 respectively when the current abnormality detecting unit 17 has detected an abnormal state of at least one of the motor 2 and the motor driving unit.

In these cases as well, an effect similar to that of the aforementioned first embodiment of the present invention or the aforementioned second embodiment of the present invention can be achieved.

Third Embodiment

In the aforementioned first embodiment of the present invention and the aforementioned second embodiment of the present invention, the two-phase DC motor is employed to constitute the power steering apparatus. However, the present invention is not limited to this construction. The motor may also be designed as a three-phase DC motor.

Description of the components identical to those of the first embodiment will be omitted.

Figure 8:
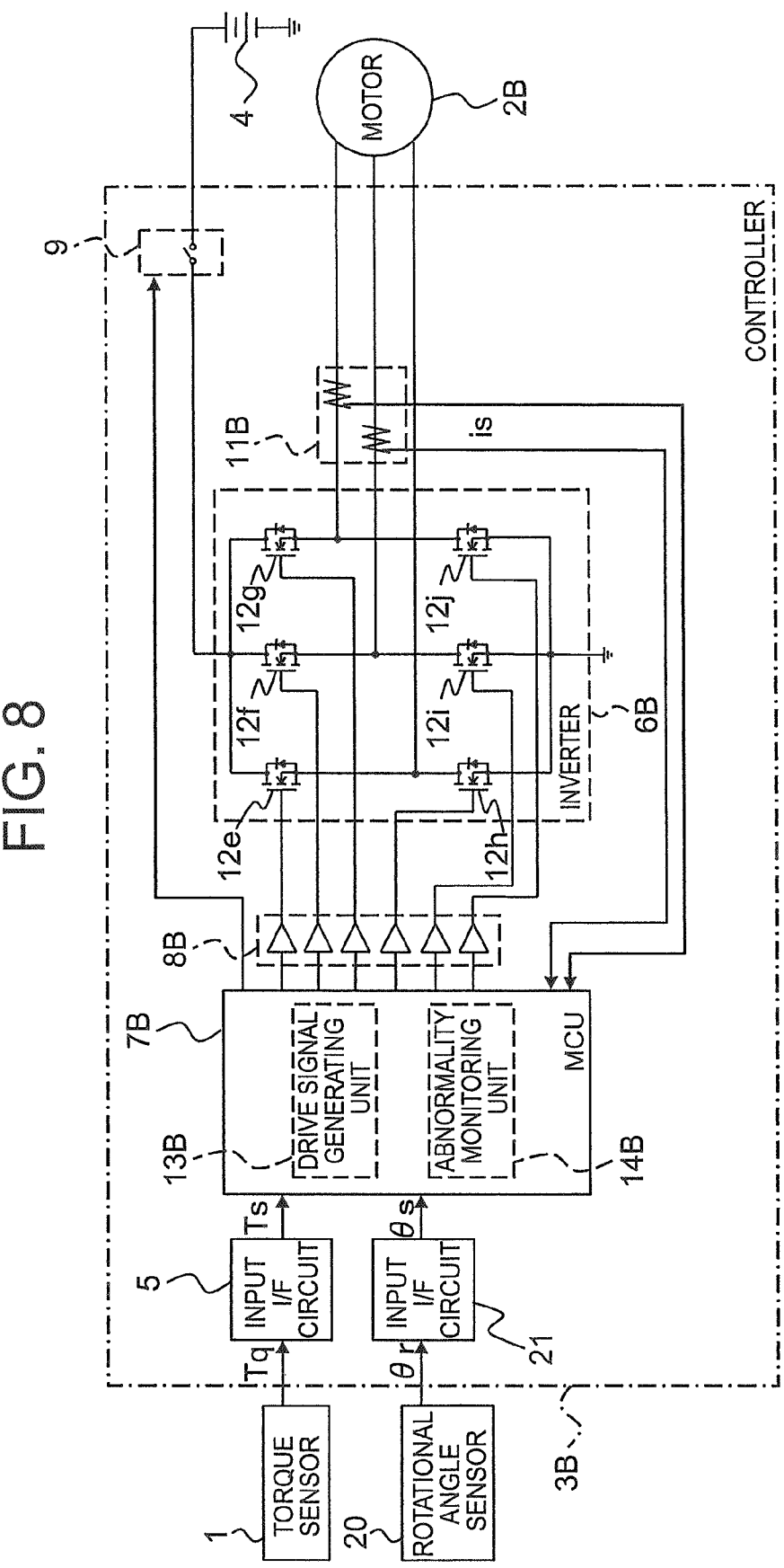
FIG. 8 is a schematic diagram showing a power steering apparatus according to a third embodiment of the present invention.

FIG. 8 is a schematic diagram showing a power steering apparatus according to the third embodiment of the present invention.

Referring to FIG. 8, the power steering apparatus is further equipped with a rotational angle sensor 20 for detecting a rotational angle θr of a rotor (not shown) of a motor 2B. The motor 2B is designed as a three-phase DC brushless motor of a permanent magnet field type.

A controller 3B further includes an input interface circuit 21. The input interface circuit 21, to which the rotational angle θr output by the rotational angle sensor 20 is input, outputs a rotational angle signal θs to an MCU 7B.

The controller 3B includes an inverter 6B, the MCU 7B, a gate driving circuit 8B, and a motor current detecting circuit 11B instead of the inverter 6, the MCU 7, the gate driving circuit 8, and the motor current detecting circuit 11 shown in FIG. 1, respectively.

The motor 2B is designed as a three-phase DC brushless motor, so the inverter 6B has six FET elements 12*e* to 12*j*.

The FET elements 12*e* to 12*g* provided between the motor 2B and the battery 4 are referred to as upper FET elements. The FET elements 12*h* to 12*j* provided between the motor 2B and the ground are referred to as lower FET elements.

The motor 2B is designed as a three-phase DC brushless motor, so the gate driving circuit 8B is designed as a three-phase circuit.

A drive signal generating unit 13B of the MCU 7B calculates a target current caused to flow through the motor 2B based on the steering force signal Ts. The drive signal generating unit 13B calculates an amount of work in PWM-driving the motor 2B in accordance with the rotational angle signal θs such that the deviation between the aforementioned target current and a value indicated by the motor current signal "is" becomes 0. The drive signal generating unit 13B generates voltage pulses for driving the FET elements 12*e* to 12*j* of the inverter 6B based on the aforementioned amount of work.

Figure 9:
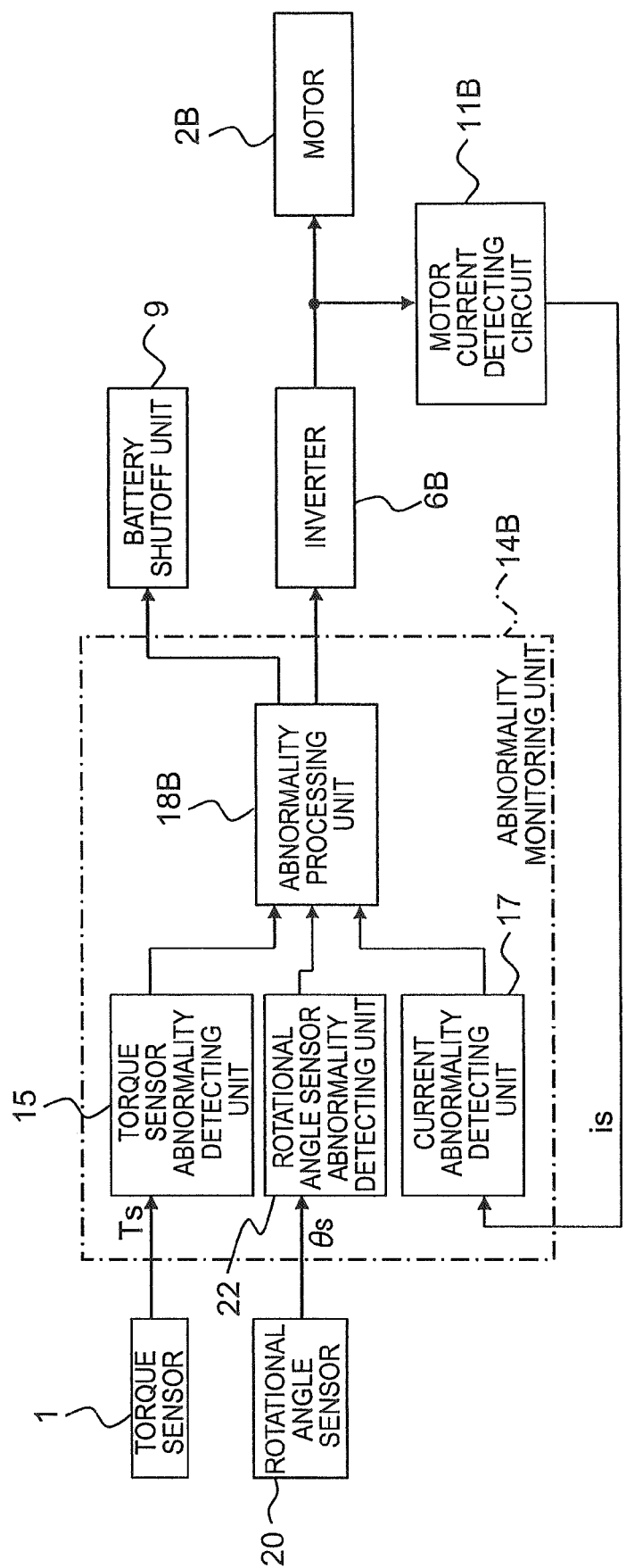
FIG. 9 is a block diagram showing an abnormality monitoring unit according to the third embodiment of the present invention together with peripheral components thereof.

FIG. 9 is a block diagram showing an abnormality monitoring unit 14B according to the third embodiment of the present invention together with peripheral components thereof.

Referring to FIG. 9, the abnormality monitoring unit 14B further includes a rotational angle sensor abnormality detecting unit 22, to which the rotational angle signal θs from the rotational angle sensor 20 is input.

The abnormality monitoring unit 14B includes an abnormality processing unit 18B instead of the abnormality processing unit 18 shown in FIG. 2.

The rotational angle sensor abnormality detecting unit 22 detects an abnormal state of the motor 2B and outputs an abnormality signal to the abnormality processing unit 18B when, for example, the rotational angle signal θs indicates a value larger than an arbitrarily set upper limit θH.

The abnormality processing unit 18B outputs to the inverter 6B an operational command to open the upper FET elements 12*e* to 12*g* and an operational command to short-circuit the lower FET elements 12*h* and 12*i* among the lower FET elements 12*h* to 12*j* to constitute the closed-loop circuit including the motor 2B, when an abnormality signal has been output from at least one of the torque sensor abnormality detecting unit 15, the current abnormality detecting unit 17, and the rotational angle sensor abnormality detecting unit 22.

The third embodiment of the present invention is identical to the aforementioned first embodiment of the present invention in other configurational details, so description thereof will be omitted.

Figure 10:
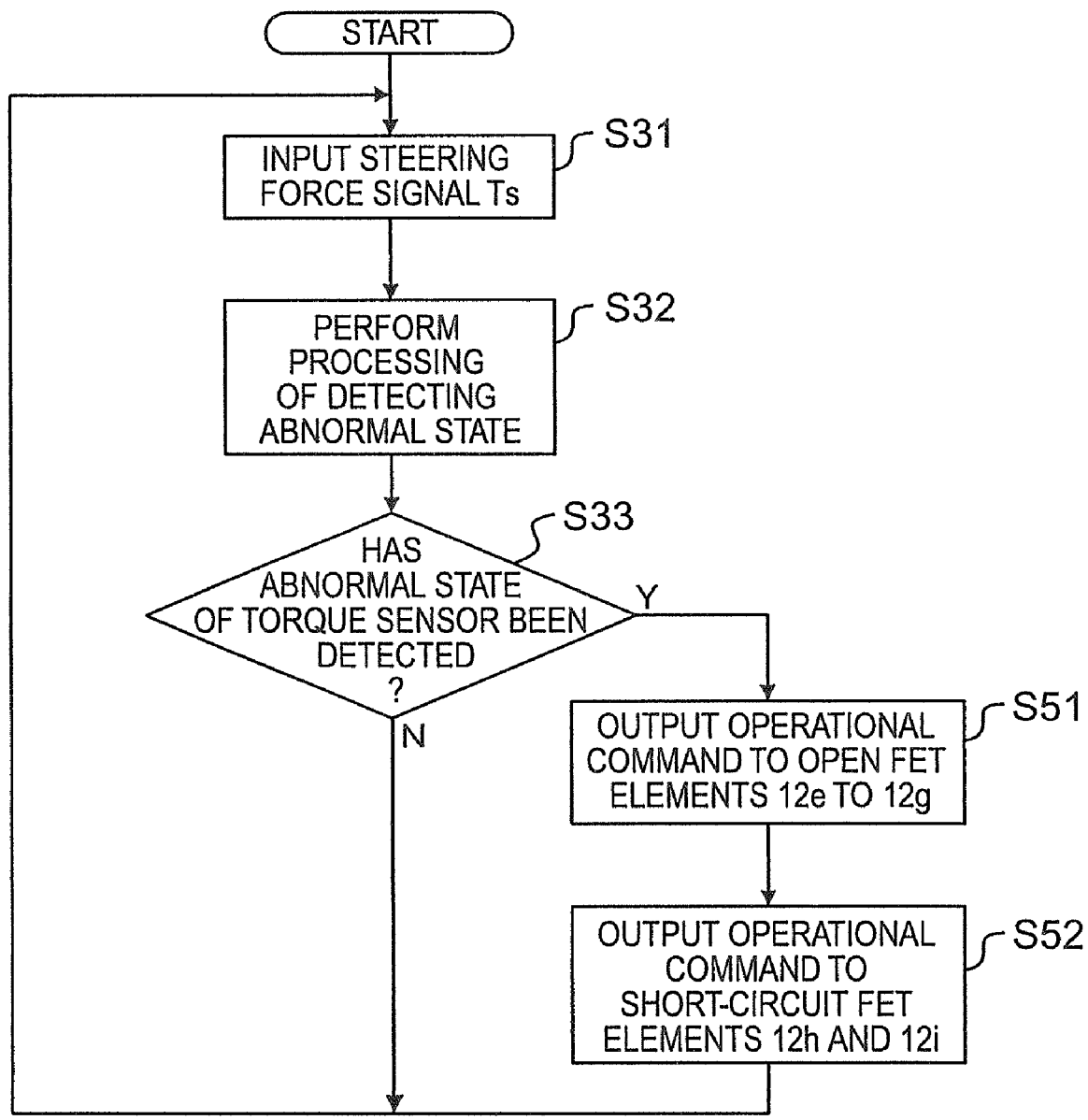
FIG. 10 is a flowchart explaining the operation of a micro controller unit (MCU) according to the third embodiment of the present invention.

The operation of the MCU 7B according to the third embodiment of the present invention will be described hereinafter with reference to a flowchart of FIG. 10 as well as FIGS. 8 and 9.

The same operational details as in the first embodiment of the present invention will not be described.

It is assumed herein that the MCU 7B has not detected any abnormality or the like.

First, the abnormality processing unit 18B determines whether or not an abnormal state of the torque sensor 1 has been detected (Step S33).

When it is determined in Step S33 that an abnormal state of the torque sensor 1 has been detected (i.e., Yes), an operational command to open the upper FET elements 12*e* to 12*g* is output from the abnormality processing unit 18B to the inverter 6B (Step S51).

The upper FET elements 12*e* to 12*g* are opened due to this operational command, so the battery 4 and the inverter 6B are shut off from each other.

Then, an operational command to short-circuit the lower FET elements 12*h* and 12*i* among the lower FET elements 12*h* to 12*j* is output from the abnormality processing unit 18B to the inverter 6B (Step S52).

The FET elements 12*h* and 12*i* are short-circuited due to this operational command, so the input terminals of the motor 2B are short-circuited. As a result, the closed-loop circuit including the motor 2B is constituted.

At this moment, since the motor 2B is designed as a motor of a permanent magnet field type, the closed-loop circuit including the motor 2B operates as a braking circuit without performing field current control when an abnormal state of the torque sensor 1 is detected. Since the motor 2B is designed as a three-phase DC brushless motor, a braking force can be obtained when any two phases of the input terminals of the motor 2B are short-circuited.

With the power steering apparatus according to the third embodiment of the present invention, when the torque sensor abnormality detecting unit 15 detects an abnormal state of the torque sensor 1 which requires the abnormality processing unit 18B to stop the driving of the motor 2B, the abnormality processing unit 18B outputs to the inverter 6B an operational command to open the upper FET elements 12e to 12g and an operational command to short-circuit the lower FET elements 12h and 12i among the lower FET elements 12h to 12j to thereby constitute the closed-loop circuit including the motor 2B.

Thus, there is generated a braking force in the closed-loop circuit including the motor 2B. Therefore, even in the event of a transition from power steering to manual steering, an abrupt change in steering force is suppressed due to this braking force. Consequently, a deterioration in steering feeling can be prevented.

The abnormality processing unit 18B according to the aforementioned third embodiment of the present invention outputs to the inverter 6B an operational command to short-circuit the lower FET elements 12h and 12i among the lower FET elements 12h to 12j when an abnormal state of the torque sensor 1 has been detected. However, the present invention is not limited to this configuration.

The abnormality processing unit 18B may output to the inverter 6B an operational command to short-circuit all the lower FET elements 12h to 12j when an abnormal state of the torque sensor 1 has been detected.

In this case, all the three-phase input terminals of the motor 2B are short-circuited, so a larger braking force can be obtained in comparison with a case in which two-phase input terminals are short-circuited.

The abnormality processing unit 18B according to the aforementioned third embodiment of the present invention outputs an operational command to the inverter 6B when an abnormal state of the torque sensor 1 has been detected. However, the present invention is not limited to this configuration.

As described in the aforementioned second embodiment of the present invention, a motor short-circuiting unit may be provided between the motor 2B and the inverter 6B, and the abnormality processing unit 18B may output a short-circuit command to the motor short-circuiting unit when an abnormal state of the torque sensor 1 has been detected.

The motor short-circuiting unit is short-circuited due to this short-circuit command, so the input terminals of the motor 2B are short-circuited. As a result, a closed-loop circuit including the motor 2B is constituted.

In this case as well, an effect similar to that of the aforementioned third embodiment of the present invention can be achieved.

The operation of the abnormality processing unit 18B according to the aforementioned third embodiment of the present invention has been described as to an exemplary case in which the torque sensor abnormality detecting unit 15 has detected an abnormal state of the torque sensor 1. However, the present invention is not limited to this exemplary case.

The abnormality processing unit 18B may output an operational command to the inverter 6B when the current abnormality detecting unit 17 has detected an abnormal state of at least one of the motor 2B and the motor driving unit.

Alternatively, the abnormality processing unit 18B may output an operational command to the inverter 6B when the rotational angle sensor abnormality detecting unit 22 has detected an abnormal state of the motor 2B.

In these cases as well, an effect similar to that of the aforementioned third embodiment of the present invention can be achieved.

In the aforementioned first embodiment of the present invention, the aforementioned second embodiment of the present invention, and the aforementioned third embodiment of the present invention, each of the inverters 6 and 6B may open the closed-loop circuit including each of the motors 2 and 2B as soon as a predetermined arbitrary period of time elapses after having constituted the closed-loop circuit.

Thus, an abrupt change in steering force is suppressed due to a braking force generated in the closed-loop circuit including each of the motors 2 and 2B immediately after an abnormality signal has been output from at least one of the torque sensor abnormality detecting unit 15, the current abnormality detecting unit 17, and the rotational angle sensor abnormality detecting unit 22. After the lapse of the predetermined period of time since constitution of the closed-loop circuit, a deterioration in follow-up performance is prevented.

Therefore, a deterioration in steering feeling can further be prevented.

What is claimed is:

1. A power steering apparatus comprising:
   steering force detecting means for detecting a steering force;
   a motor of a permanent magnet field type for supplementing the steering force; and
   control means having motor driving means and abnormality monitoring means, for controlling driving of the motor, wherein:
   the motor driving means includes an inverter for driving the motor, and drive signal generating means for calculating a target current caused to flow through the motor based on an output of the steering force detecting means, and outputting a drive signal for driving the inverter based on the target current, the inverter including upper switching elements connected between a battery and the motor and lower switching elements connected between the motor and a ground; and
   the abnormality monitoring means includes abnormality processing means for opening the upper switching elements and closing the lower switching elements, thereby constituting a closed-loop circuit including the motor in stopping driving of the motor.

2. A power steering apparatus comprising:
   steering force detecting means for detecting a steering force;
   a motor of a permanent magnet field type for supplementing the steering force;
   short-circuiting means for short-circuiting input terminals of the motor;
   a battery shutoff unit which connects and disconnects a battery; and
   control means having motor driving means and abnormality monitoring means, for controlling driving of the motor, wherein:
   the motor driving means includes an inverter, connected between the motor and the battery via the battery shutoff unit, for driving the motor, and drive signal generating means for calculating a target current caused to flow through the motor based on an output of the steering force detecting means, and outputting a drive signal for driving the inverter based on the target current, and
   the abnormality monitoring means includes abnormality processing means which operates the battery shutoff unit to disconnect the battery from the inverter and operates the short-circuiting means to constitute a closed-loop circuit including the motor in stopping driving of the motor.

3. A power steering apparatus comprising:
steering force detecting means for detecting a steering force;
a motor of a permanent magnet field type for supplementing the steering force; and
control means having motor driving means and abnormality monitoring means, for controlling driving of the motor, wherein
the motor is a three-phase motor,
the motor driving means includes an inverter for driving the three-phase motor, and drive signal generating means for calculating a target current caused to flow through the three-phase motor based on an output of the steering force detecting means, and outputting a drive signal for driving the inverter based on the target current, and
the abnormality monitoring means includes abnormality processing means for constituting a closed-loop circuit including the three-phase motor in stopping driving of three-phase the motor.

4. The power steering apparatus according to claim 3, wherein the inverter includes three upper switching elements connected between the three-phase motor and a battery and three lower switching elements connected between the three-phase motor and a ground.

5. The power steering apparatus according to claim 4, wherein the abnormality processing means opens all of the upper switching elements and closes at least two of selected ones of the lower switching elements, thereby constituting the closed-loop circuit including the three-phase motor.

6. The power steering apparatus according to claim 5, wherein the abnormality processing means closes all of the lower switching elements.

\* \* \* \* \*